Patented Dec. 13, 1932

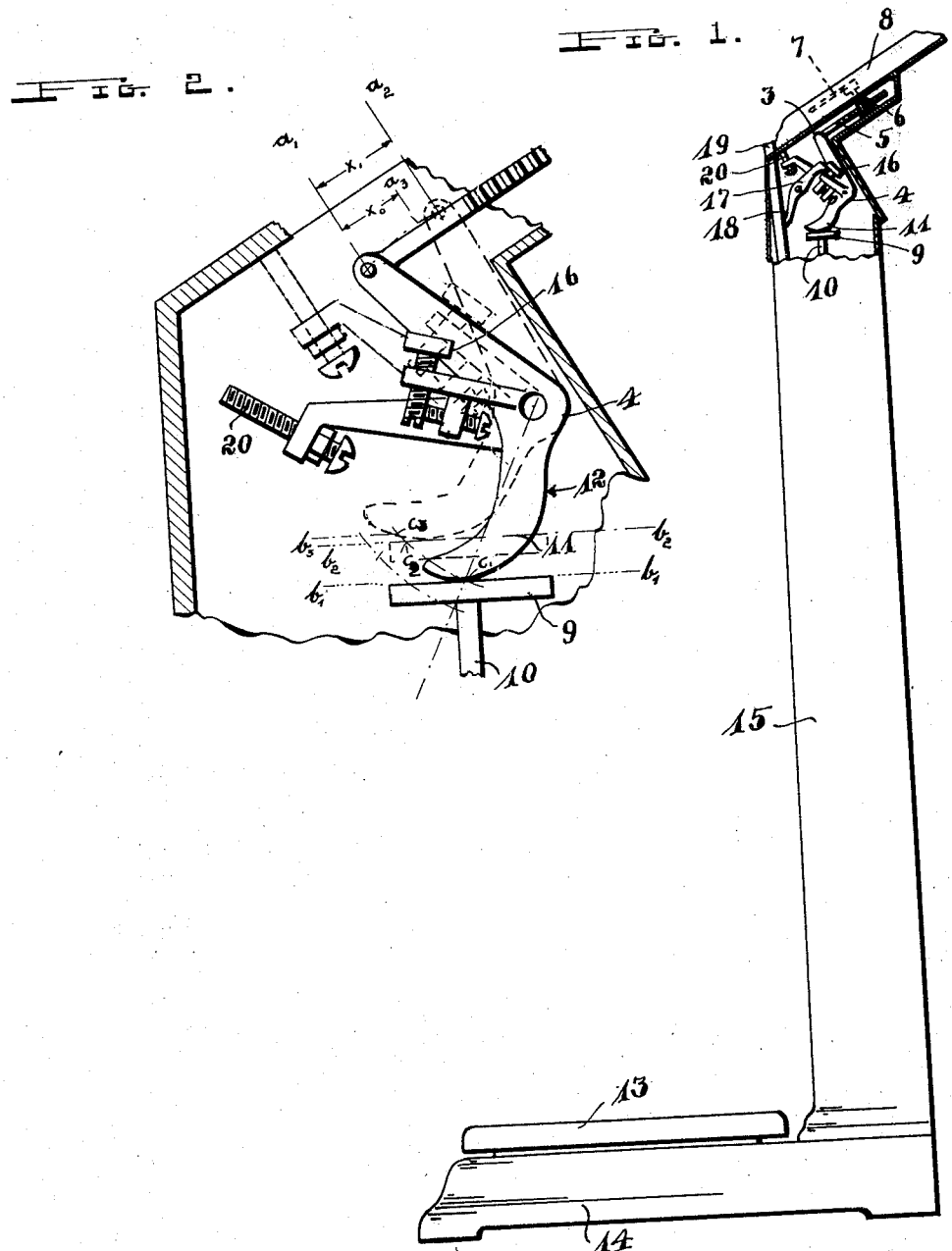

1,890,706

UNITED STATES PATENT OFFICE

NORMAN TATHAM, OF LOS ANGELES, CALIFORNIA

SCALE MECHANISM

Application filed November 30, 1929. Serial No. 410,724.

This invention relates to devices used for actuating a weight-indicating mechanism and operative by a weight or material supporting platform.

One of the objects of this invention is to provide an operating lever with a curved portion so designed that the various movements of the platform can be transmitted through the lever by means of the curved portion to result in movements of predetermined equal distances on the dial of the weight-indicating mechanism.

Another object is to provide adjustable locking means for the lever by which the lever and therewith the weight-indicating mechanism can be held in inoperative position.

Another object is to provide releasing means for the locking means in order that the lever can follow the movements of the upwardly extending connecting rod of the platform for transmitting such movements to the weight-indicating mechanism.

Another object is to provide controlling means whereby the lever can be set so as to bring the indicating mechanism in to certain predetermined positions.

Other objects will appear from the following description and appended claims as well as from the accompanying drawing, in which—

Fig. 1 is a side elevation of a scale partly broken away in its upper portion to illustrate the cooperative relation of certain parts according to this invention.

Fig. 2 is a fragmentary detail side elevation of an operating lever illustrated in cooperative relation to other parts by which the lever is actuated and which in turn are actuated by the lever.

A weight indicating mechanism suggested and referred to in this application and commonly used on scales of the type involved in this application generally includes a dial and an indicating hand in which the hand moves over a certain range or space or distance on the dial to indicate certain variations of weight.

A platform, on the other hand, also moves a certain distance under the influence of a certain weight, which, however, may differ considerably from the movement of the hand in regard to the dial.

The end 3 of the lever 4 as illustrated in the drawing in Fig. 1, operatively connected to the gear-rack 5 for rotating the gear-pinion 6 by which the hand 7 may be moved in regard to the dial-head 8, may be moved from the point $a_1$ to the point $a_2$, indicated in Fig. 2; while the top plate 9 of the rod 10 extending upwardly from the platform should move only from the point $b_1$ to the point $b_2$, which would bring the same contacting point of the lever 11 eventually from point $c_1$ to point $c_2$, a distance indicated better by the dotted lines designated between the points $b_1$ and $b_3$.

From this it will be clear that a lever designed to contact with the same point on the top surface of the plate 9 would move further than properly required by the movement of the platform on which the lever depends for its operation.

By curving the contacting edge of the lever-end 11 in the manner indicated at 12 it is made possible to transmit any movement from the platform 13 of the scale disposed over the base 14 through the rod 10 passing upwardly through the standard or upright 15 of the scale to the weight-indicating dial in the head 8 of the scale.

Moreover, the curving of the lever-end 11 at 12 facilitates a transforming of any movement, regardless of how uneven various movements caused by various weights may be, into certain equally proportioned movements on the dial by reason of the fact that the curvature of the lever-end 11 is designed so as to take care of this very feature, that is, of assuring accurately equalized movements of the indicating hand over the equally graduated dial in the head 8.

This feature of this invention is especially adapted to simplify the operation of a scale and to facilitate a proper operation of the scale with the least number of parts, resulting not only in a very reasonably priced scale but also in a very durable structure.

That other controlling parts and mechanisms are provided on the lever and so as to cooperate with the lever is only secondary though some of the parts make the lever adjustable and more practical.

An adjustable locking screw 16 is provided on the lever to cooperate with the locking pawl 17 for holding the weight-indicating mechanism in inoperative position.

For limiting the movements of the lever and for controlling the starting and stopping positions of the lever an adjustable screw 20 is also provided on the lever.

The pawl 17 is provided with a portion 18 to be disposed in the path of a coin or other similar actuating member to be dropped through a suitable chute of which the upper end is indicated at 19 for releasing the pawl from engagement with the lever for the proper operation of the weight indicating mechanism.

Having thus described my invention, I claim:

1. In a scale, in combination with a weight-supporting mechanism and a weight-indicating mechanism, a lever comprising substantially two swingable ends with a common central pivot-support with means for pivotal connection with said indicating mechanism at one end and embodying a curved portion in the other of said ends forming the operating-radius varying contacting means by which the various movements of the weight-supporting mechanism can be transformed into certain proportioned movements in the weight-indicating mechanism.

2. In a scale, a weight-supporting mechanism including a contact-member in its uppermost terminal, a weight-indicating mechanism, and a lever operatively connected to the weight-indicating mechanism and embodying a curved portion to contact with the said contact member and adapted to transform the various movements of the weight-supporting mechanism in equally proportioned movements in the weight-indicating mechanism.

3. In a scale, a weight-supporting mechanism, a weight-indicating mechanism, a lever embodying a curved contact-portion adapted to contact with one of said mechanisms in such a manner as to synchronize the movements of the two mechanisms, an adjustable locking means for the lever for holding the lever in inoperative position, and an adjustable checking means for setting the lever for a predetermined starting and stopping position.

In testimony that I claim the foregoing as my invention I have signed my name.

NORMAN TATHAM.